United States Patent
Hindenach

(10) Patent No.: US 10,736,430 B2
(45) Date of Patent: Aug. 11, 2020

(54) PROPANE HEATED SEAT

(71) Applicant: Brian Hindenach, Middleville, MI (US)

(72) Inventor: Brian Hindenach, Middleville, MI (US)

( * ) Notice: Subject to any disclaimer, the term of this patent is extended or adjusted under 35 U.S.C. 154(b) by 144 days.

(21) Appl. No.: 15/452,048

(22) Filed: Mar. 7, 2017

(65) Prior Publication Data
US 2018/0255934 A1 Sep. 13, 2018

(51) Int. Cl.
| | |
|---|---|
| A47C 7/74 | (2006.01) |
| A01M 31/02 | (2006.01) |
| A47C 4/02 | (2006.01) |
| F24H 9/06 | (2006.01) |
| F23D 14/28 | (2006.01) |
| F23D 14/12 | (2006.01) |
| A47C 7/42 | (2006.01) |
| A47C 7/62 | (2006.01) |

(52) U.S. Cl.
CPC ............ *A47C 7/748* (2013.01); *A01M 31/02* (2013.01); *A47C 4/02* (2013.01); *A47C 7/42* (2013.01); *A47C 7/626* (2018.08); *F23D 14/12* (2013.01); *F23D 14/28* (2013.01); *F24H 9/06* (2013.01)

(58) Field of Classification Search
CPC ...................................................... A47C 7/748
USPC .......................... 297/180.1, 180.15, 205, 208
See application file for complete search history.

(56) References Cited

U.S. PATENT DOCUMENTS

| | | | | |
|---|---|---|---|---|
| 2,212,618 | A * | 8/1940 | Rifkin | B65F 1/14 220/560.01 |
| 2,567,323 | A * | 9/1951 | Cyphert | F24C 5/20 126/96 |
| 3,744,842 | A * | 7/1973 | Ronning | A01M 31/025 135/901 |
| 3,745,987 | A * | 7/1973 | Dribnenki | F24C 5/20 126/38 |
| 5,405,186 | A * | 4/1995 | Hanson | A47C 7/748 126/208 |
| 2003/0131840 | A1 * | 7/2003 | Hubscher | A01K 97/01 126/204 |

\* cited by examiner

*Primary Examiner* — Grant Moubry
*Assistant Examiner* — Aaron H Heyamoto
(74) *Attorney, Agent, or Firm* — Foster, Swift, Collins & Smith, P.C.; Zachary W. Bëhler

(57) ABSTRACT

A device used to heat seats, chairs, and tree stands using propane as the heat source.

5 Claims, 6 Drawing Sheets

PROPANE HEATED SEAT

FIELD OF THE INVENTION

This invention relates to chair that is heated by propane.

BACKGROUND OF THE INVENTION

There is often an occasion to sit outside for long periods of time. This may occur while watching sporting events, hunting, ice fishing, and camping.

U.S. Patent application publication number 2009/0072594 discloses a HEATED PORTABLE BATTERY POWERED SPORTS CHAIR. The detailed description does not appear to specifically disclose how the invention is made.

There is a need for a chair that can be heated by a propane tank so no electricity is needed.

There is a need for a propane heated chair or seat that can be located on a chair or tree stand.

Multiple embodiments of the system are disclosed herein. It will be understood that other objects and purposes of the invention, and variations thereof, will be apparent upon reading the following specification and inspecting the accompanying drawings.

SUMMARY OF THE INVENTION

One aspect of the present invention is a propane device to heat a seat, comprising: a base to receive a propane tank; said base having a recess; a collar secured to a propane tank; said collar having legs that extend upwardly and outwardly; a burner threadedly secured to said propane tank; said burner having a valve to turn on and adjust the flow of propane gas; and a heat plate secured to said legs and disposed above said burner.

Another aspect is a propane device to heat a seat, comprising: a base to receive a propane tank; said base having a recess; a collar secured to a propane tank; said collar having legs that extend upwardly and outwardly; a burner threadedly secured to said propane tank; said burner having a valve to turn on and adjust the flow of propane gas; a heat plate secured to said legs and disposed above said burner; a housing that encapsulates said propane tank, whereby said housing is made of a fireproof fabric; and a zipper and zipper material between the housing top and at least two sides of a wall so one housing wall can be opened.

A third aspect is an assembly seat portion and housing, consisting of: a housing supported by a frame; said housing containing a propane tank fitting therein; said housing made of a fireproof fabric; said frame made of a rigid material; said housing top 100 having at least one of either a loop or hook material to be removably secured to an associated hook or loop portion under a seat portion; said propane tank fitting having a base; said base having a recess to receive a propane tank; a collar removably secured to said propane tank; legs extending upwardly and outwardly from said collar; a heat plate secured to said legs above a burner; and a burner removably secured to the propane tank.

These and other features, aspects and advantages of the present invention will become better understood with reference to the following drawings, description and claims.

DETAILED DESCRIPTION OF THE INVENTION

Figure 2:
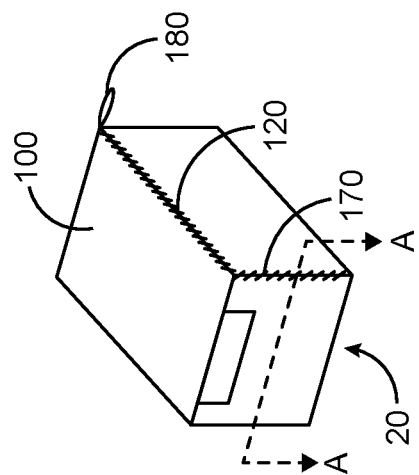
FIG. 2 is a pictorial view of an embodiment of the present invention.

| REFERENCE NUMERALS LIST | |
|---|---|
| 10 | propane heated seat |
| 20 | housing |
| 30 | propane tank fitting |
| 40 | base |
| 50 | burner |
| 60 | frame |
| 70 | heat plate |
| 80 | collar |
| 90 | propane tank |
| 100 | top |
| 110 | hand warming aperture |
| 120 | chair or tree stand |
| 130 | seat portion |
| 140 | recess |
| 150 | legs |
| 160 | valve |
| 170 | zipper material |
| 180 | zipper |
| 190 | straps |
| 200 | vent |
| 210 | fuel line |
| 220 | adjustable clips |
| 230 | tree stand |
| 240 | weight bearing plate |
| 250 | frame bottom |
| 260 | loop or hook strap |
| 270 | hook or loop strap |
| 280 | bolt |
| 290 | pocket |
| 300 | threaded rod |
| 310 | fuel line |
| 320 | removeable seat back |
| 330 | seat back posts |
| 340 | housing posts |

The following detailed description is of the best currently contemplated modes of carrying out the invention. The description is not to be taken in a limiting sense, but is made merely for illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

Figure 1:
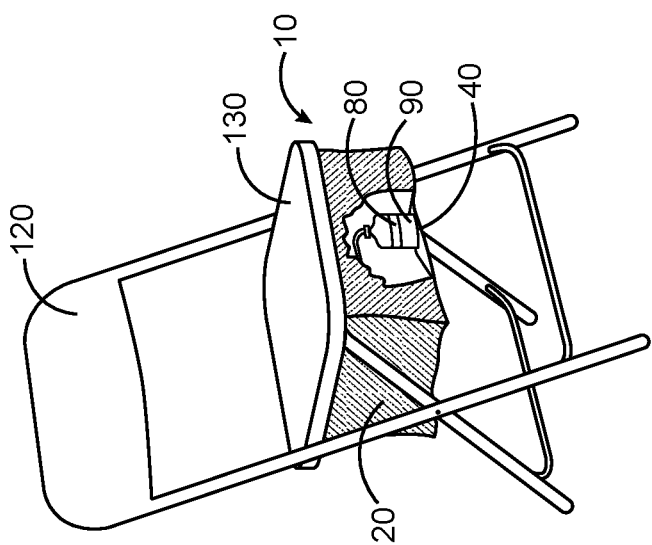
FIG. 1 is a pictorial view of an embodiment of the present invention under a chair seat.

FIG. 1 illustrates one embodiment of the present invention 10, referred to herein as a propane heated chair 10. The propane heated chair 10 may be connected to a foldable chair or a tree stand. A one (1) pound capacity propane tank may be used. Some sources of a tank are: (http://www.irv2.com/forums/f84/anyone-know-how-long-the-small-propane-tanks-last-on-a-mr-heater-78364.html) indicate that a one (1) pound or 16.4 ounce capacity propane tank can have about a 4.5 hour burn time.

Figure 10:
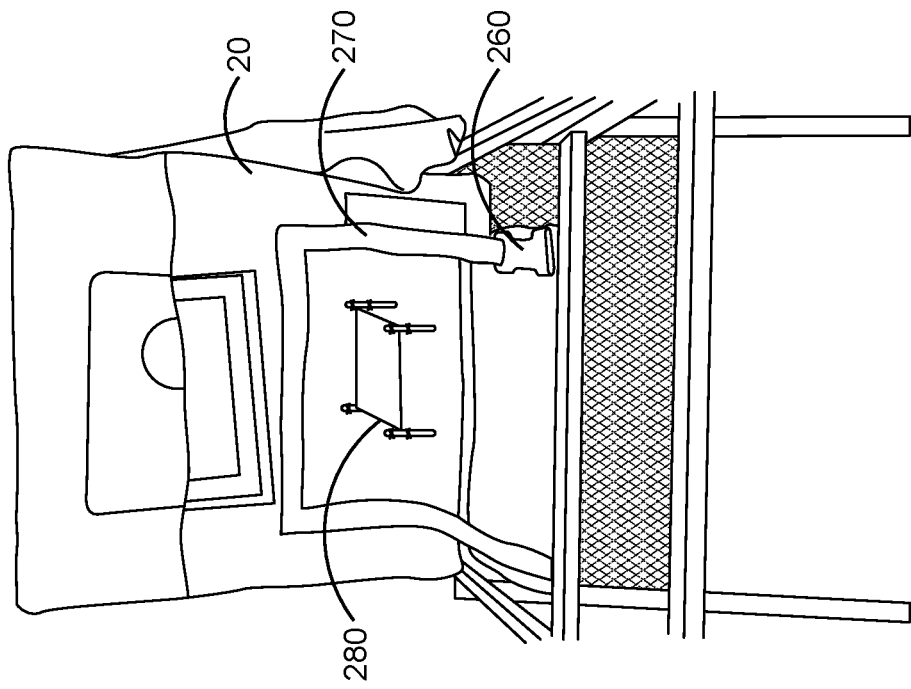
FIG. 10 is a pictorial view of an open housing.

FIG. 1 illustrates an embodiment having a housing 20. The housing may have a hand warming aperture 110 in a wall of the housing. The housing 20 may be able to be opened and closed via on slide removably secured via Velcro® or a loop 260 and hook 270 material, as seen in FIG. 10. The inside or interior side of a portion of the one of the walls may have a loop 260 or hook 270 material to mate with a corresponding hook 260 or loop 270 material on an outside of a portion of one of the walls. Alternatively, the housing may be opened and closed via a zipper 180 and zipper material 170 between the housing top 100 and at least two sides of a wall so one housing 20 wall can be opened and closed. The housing 20 may be opened or closed via snaps or magnetic means.

The propane tank 90 may be positioned inside the housing 20 or outside the housing 20.

The housing 20 may be made of a fire-proof flexible fabric or other material. One acceptable material may be found at this website; (https://www.alibaba.com/showroom/flexible-fireproof-material.html).

The housing 20 may be a fireproof fabric material, or the housing 20 may be metal, or other fireproof material.

Figure 8:
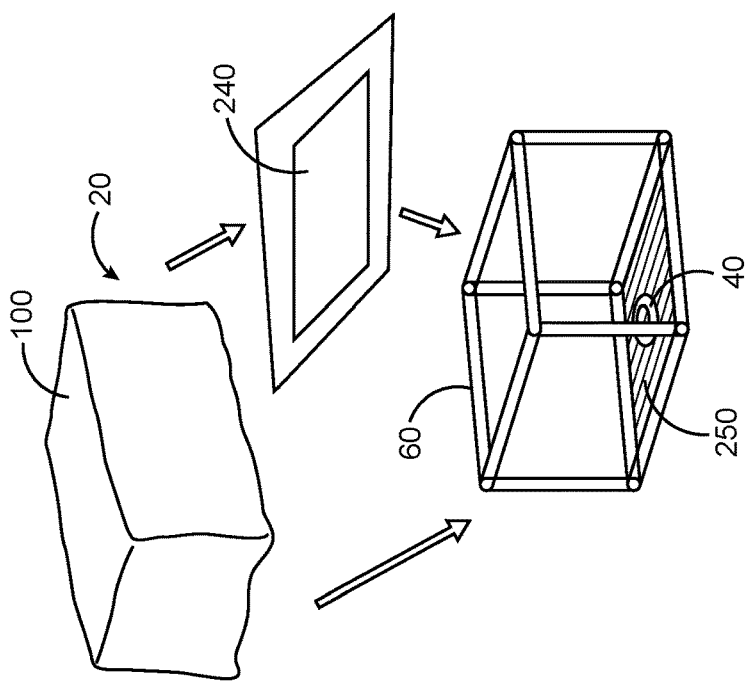
FIG. 8 is a pictorial view of an embodiment of a frame of the present invention with an optional weight bearing plate.

The housing 20 may be supported by a metal or rigid frame 60, as illustrated in FIG. 8. The metal frame 60 may be foldable similar to foldable dog cages, as advertised at jet.com, and one product would be called the Large Folding Steel Pet Travel Kennel and Training Cage (29.5"×20"×24"). Although the present invention 10 could be of any size, it's length and width would be the same size as a typical seat or chair, and the height would only have to accommodate the height of the propane tank fitting 30. Alternatively, the frame 60 may be fixed and not foldable. The housing 60 may have a bottom and the frame 20 may be able to be placed within the housing 60 by opening the housing 60 via a zipper 180.

The housing frame 60 may be collapsible similar to a folding card table, such as one model; Flash Furniture Kids Blue Folding Table Kids Blue Folding Table—View Complete Details; Product Number: FHFJBTABLEGG. So, in use, the frame legs may be unfolded to the frame 60 is supported above the ground, and the burner 50 placed in the frame 60, and then the housing 20 can be placed over the frame.

FIG. 1 illustrates the housing 20 secured under the seat portion 130 of the chair 120. The seat portion 130 may have a removable back. FIG. 1 also illustrates a cut-away view of the housing 20 of the present invention 10 to see the propane tank 90 and propane tank fitting 30, better seen in FIG. 3. In one embodiment, the propane tank fitting 30 may have a base 40 that the stabilizes the propane tank 30 from falling over. A recess 140 receives the propane tank 90. The diameter of the recess 140 may be about 1/16 inch larger than the outside diameter of the propane tank 90. The present invention 10 may have different size bases 40 and recesses 140 to accommodate different sized propane tanks 90. The collar 80 may also be adjustable to accommodate different sized propane tanks 90. Suitable collars 80 may include an airplane style hose clamp, an oxygen cylinder mounting bracket, or similar bracket may be used. Securely attached to the collar 80 is a frame 60. The frame 60 may have two, three, or four legs 150 securely attached to the collar 80.

Figure 9:
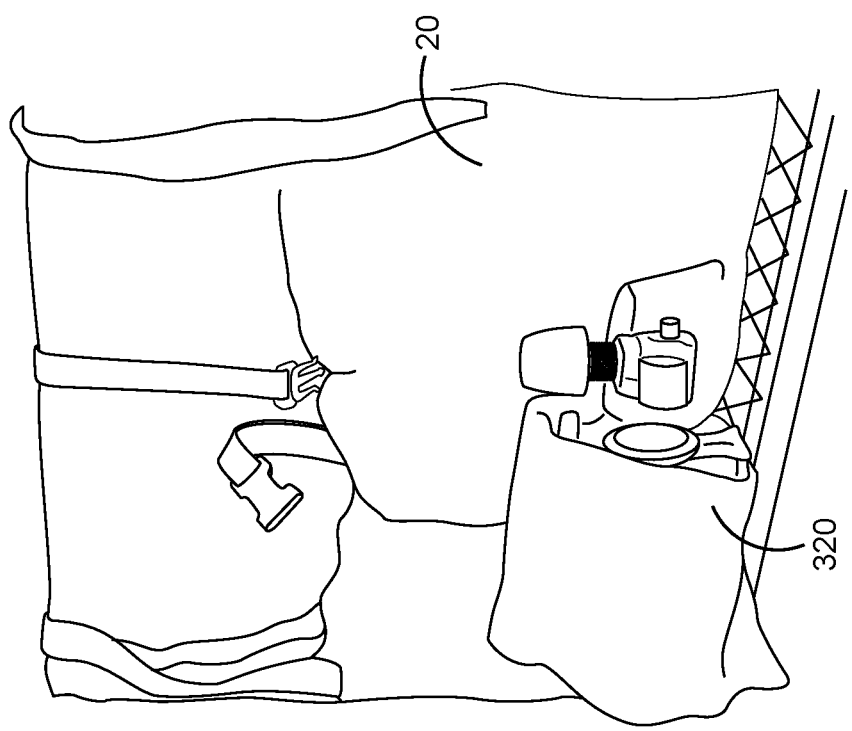
FIG. 9 is a pictorial view of a pocket that may house a propane tank.
Figure 11:
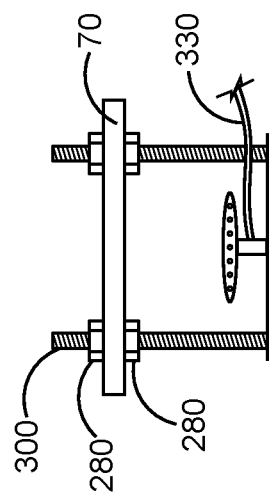
FIG. 11 is a pictorial view of the adjustable heat plate of the present invention.

Alternatively, the propane tank 90 may be positioned in a pocket 290 on the outside of the housing, as seen in FIG. 9. A burner 50 can threadably engage with the propane tank threads to screw onto the propane tank 90 and have a valve 160 to turn on and adjust the flow of propane from the propane tank 90. A heat plate 70 may be disposed above the burner 50. The heat plate 70 may be made of steel, or any rigid fireproof material. The height of the heat plate 70 may be adjustable Alternatively, the propane tank 90 may be attached to a fuel line or conduit, and the fuel line or conduit may be attached to a burner, as seen in FIG. 11. FIG. 11 also illustrates an adjustable heat plate 70 via a bolt 280 above and below the heat plate 70, and the bolts 280 threadably engaged with a threaded rod 300. The threaded rod 300 disposed through an aperture in the heat plate 70.

The valve 160 may have an automatic shut-off feature. For example, if the gas is leaking and not burning, a sensor may shut off the gas displacement.

The burner 50 may be ignited by electrical ignition, or manually with a match. One electrical burner 50 may be found at acehardware.com, Grill Mark Universal Electronic Ignitor Kit; Item no: 82199171060197206203.

Figure 3:
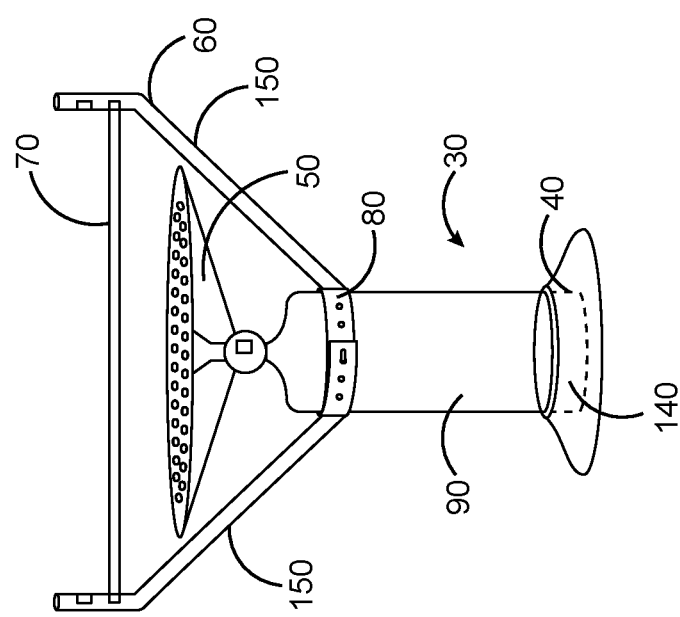
FIG. 3 is a pictorial view of an embodiment of the present invention.

FIG. 2 illustrates an embodiment of the present invention 10 not attached to a seat. The housing 20 may have a zipper 180 that can be moved on the zipper material 170 to have access to the inside of the housing 20 to access the propane tank fitting 30 as illustrated in FIG. 3. The housing 20 may have a top 100. The housing 20 may have a hand warming aperture 110.

Figure 4:
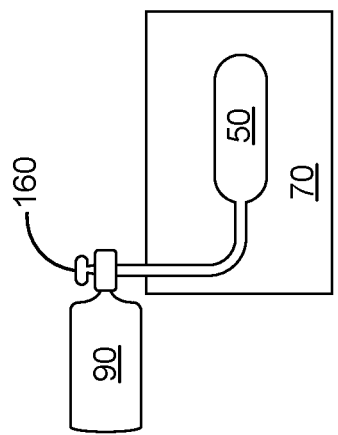
FIG. 4 is a sectional view of lines A-A from FIG. 2.

FIG. 4 illustrates an embodiment of the present invention 10 along line A-A of FIG. 2. This illustrates an embodiment of the present invention 10 having a heat plate beneath the burner 50. In one embodiment, a heat plate 70 may be disposed at the housing 20 beneath the propane tank fitting.

Figure 5:
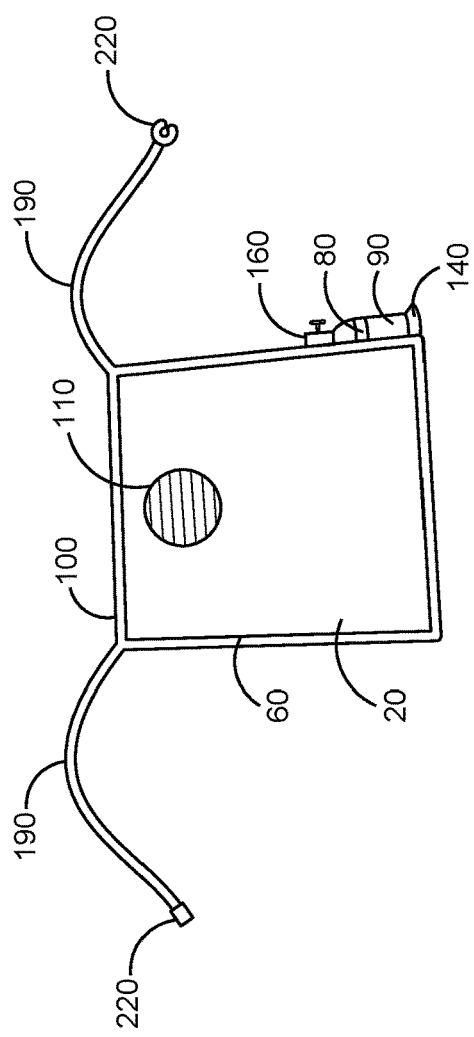
FIG. 5 is a rear pictorial view of an embodiment of the present invention.

FIG. 5 illustrates an embodiment of the present invention 10. In one embodiment, the housing 20 may have a hand warming aperture 110. A rigid or metal frame 60 may be surrounded by a housing 20 made of fireproof fabric as disclosed previously. The recess 140 that receives the propane tank 90 by be disposed outside of the housing 20, so long as the burner 50 is disposed inside the housing, as also illustrated in FIG. 4. FIG. 5 also illustrates straps 190 that can assist or be used to attach the housing 20 to a chair or tree stand 120. Alternatively loop and hook material, such as Velcro® may be used to attach the housing to the bottom of a seat or tree stand 120. For example, straps of hook material may adhesively be connected to the bottom of a chair, and corresponding straps of loop material may be attached to the top 100 of the housing 20 so that the hook material straps and loop material straps connect to secure the housing 20 to the chair or tree stand 120. FIG. 5 illustrates a vent 200 on one of the sides of the housing 20.

Figure 6:
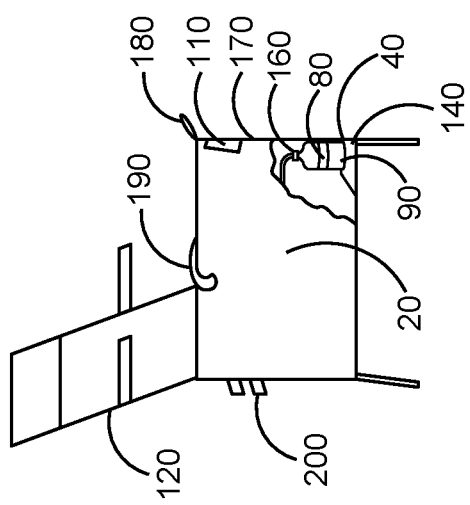
FIG. 6 is a pictorial view of another embodiment of the present invention.

FIG. 6 illustrates an embodiment where one strap 190 is tied to the chair by the straps 190. Each strap can extend over the seat portion 130 of either the chair or tree stand 120. FIG. 6 also illustrates the zipper material 170 and a hand warming aperture. FIG. 6 also illustrates a cut-away view of the housing 20 showing the recess 140 resting on the base of the housing 20. The recess 140 holds the propane tank 90 and the propane tank fitting 30.

Figure 7:
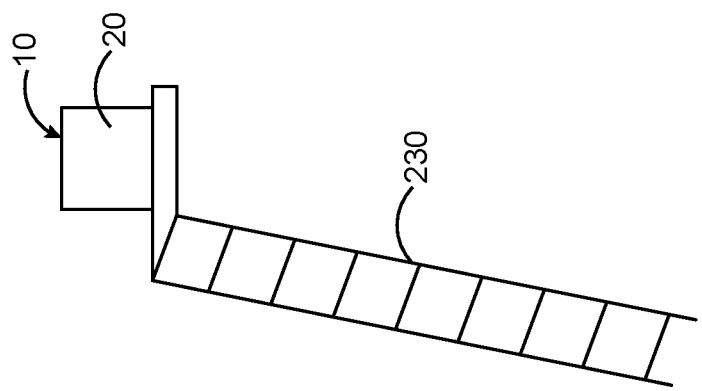
FIG. 7 is pictorial view of another embodiment of the present invention in use with a tree stand.

FIG. 7 illustrates an embodiment whereby the housing 20 is supported above a tree stand. 120. The housing 20 can be placed above the tree stand 120 as illustrated in FIG. 7, or below the tree stand 120. The person using the propane heated seat 10 sits on the top 100 of the housing FIG. 8 illustrates an embodiment of the frame 60 of the present invention 10. The frame 60 may be made of any rigid metal or non-metal material. If the frame 60 is secured below a seat portion 130, it need not have to support the weight of a person sitting on it. If, as illustrated in FIG. 7, then the frame 60 must be able to support someone sitting on the top 100. As illustrated in FIG. 8, a weight bearing plate 240 can be placed on the frame 60 so the user can sit on the top 100 which is made of the fire proof material, with the weight bearing plate 240 between the frame 60 and the housing 20, or the weight bearing plate 240 may be disposed above the housing 60.

As illustrated in FIG. 8, the base 40 may be secured to a frame bottom 250. The base 40 having a recess 140 may receive the propane tank 90 and thus the propane tank fitting 30. FIG. 8 also illustrates the housing 20 may slip over the frame 60, and the housing 20 may have an open bottom to allow the housing 20 to slip over the frame 20. In other words, the housing 20 may have a top 100, and four sides and no bottom.

FIG. 9 illustrates an embodiment showing the propane tank 90 removably disposed in a pocket 320 on the outside of the housing 20.

Figure 12:
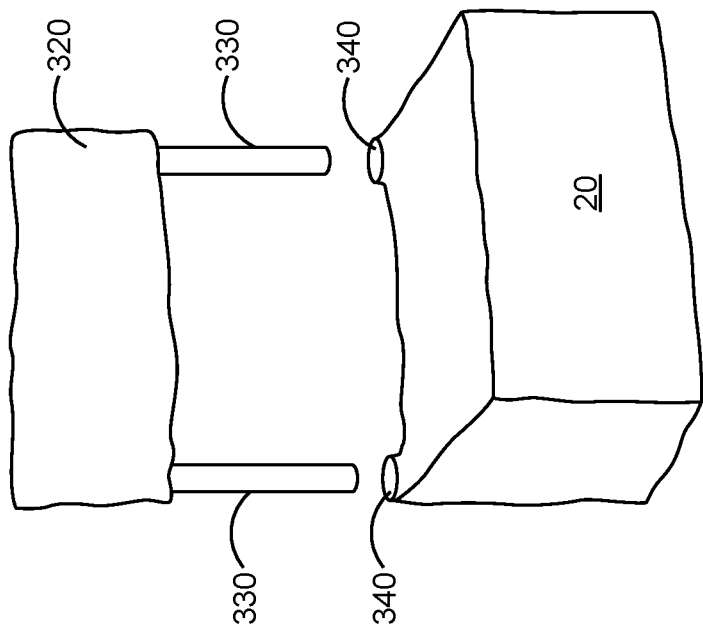
FIG. 12 is a pictorial view of a removable back rest.

FIG. 12 illustrates one embodiment of the invention having a removeable seat back 320. The seat back 320 may have seat back posts 330 extending downwardly to be removeably disposed within housing posts 340.

It should be understood, of course, that the foregoing relates to exemplary embodiments of the invention and that modifications may be made without departing from the spirit and scope of the invention as set forth in the following claims.

I claim:

1. A propane device to heat a seat comprising:
    a base to receive a propane tank; said base having a recess; a collar secured to a propane tank; said collar having legs that extend upwardly and outwardly from at least opposite sides of said collar;
    a burner threadedly secured to said propane tank; said burner having a valve to turn on and adjust the flow of propane gas; and
    a rectangular heat plate secured to said legs and disposed above said burner,
    a housing that encapsulates said burner, whereby said housing is made of at least one of either fireproof fabric or metal wherein said housing has a hand warmer comprising fireproof fabric in a wall of the housing;
    said interior of said housing able to be accessed by opening via at least one of either a (1) zipper and zipper material between a housing top and at least two sides of a wall so one housing wall can be opened; (2) the side having a portion having a material comprising at least two loops corresponding to a portion of material comprising at least two hooks; or (3) snaps.

2. An assembly seat portion and housing, consisting of:
    a housing supported by a frame;
    said housing containing a propane tank fitting therein;
    said housing made of a fireproof fabric;
    said frame made of a rigid material;
    a rectangular seat portion;
    said housing top having at least one of either a loop or hook material to be removably secured to an associated hook or loop portion under said seat portion;
    said propane tank fitting having a base; said base having a recess to receive a propane tank; a collar removably secured to said propane tank; legs extending upwardly and outwardly from said collar; a heat plate secured to said legs above a burner; and a burner removably secured to the propane tank.

3. The assembly seat portion and housing of claim 2 wherein said housing is removably secured below a seat portion via material comprising at least two loops corresponding to a portion of material comprising at least two hooks.

4. The assembly seat portion and housing of claim 2 wherein said housing is removably secured to said rectangular seat portion.

5. A propane heating assembly comprising:
    a housing made of a fireproof fabric;
    a burner removably disposed in said housing;
    a propane tank removably disposed in a pocket on the outside of said housing;
    a fuel line connected to the propane tank and the burner;
    a seat;
    a heat plate wherein said heat plate is vertically adjustable in relation to said burner so that the distance between said seat and said heat plate remains uniform across bottom of said seat and the top of said heat plate.

* * * * *